W. & W. H. LEWIS.
Lens Adjustment.
No. 8,590. Patented Dec. 16, 1851.
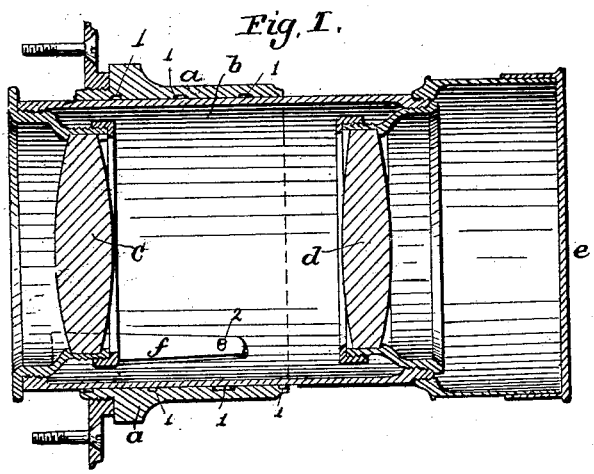
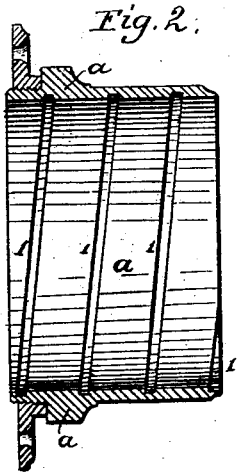
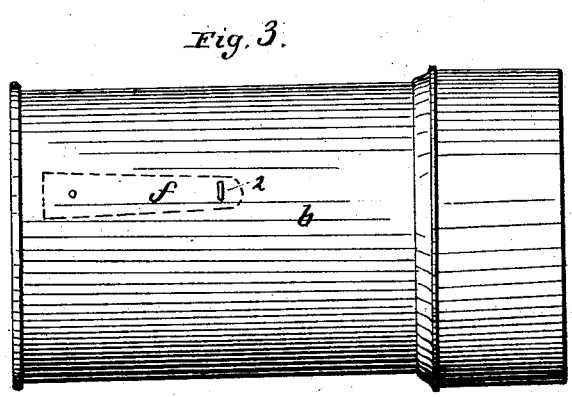
Witnesses:
W. Serrell
Lemuel W. Serrell
Inventors:
William Lewis
W. H. Lewis

UNITED STATES PATENT OFFICE.

WM. LEWIS AND WM. H. LEWIS, OF NEW YORK, N. Y.

ADJUSTING-LENS.

Specification of Letters Patent No. 8,590, dated December 16, 1851.

*To all whom it may concern:*

Be it known that we, WILLIAM LEWIS and WILLIAM H. LEWIS, of the city and State of New York, manufacturers of daguereotype apparatus, have invented, made, and applied to use certain new and useful improvements in the means of regulating and adjusting the focal distance in cameras or other optical instruments by using a spiral thread on the inside of the fixed tube, taking a pin on the smaller and inside tube, which carries the lens to be adjusted; and we hereby declare that the following is a full, clear, and exact description thereof, reference being had to the accompanying drawing, making part of this specification, wherein—

Figure 1, is a sectional elevation complete and Fig. 2, is a section of the outside cylinder, showing the spiral groove around the inside, and Fig. 3, is a view of the outside of the inner cylinder, showing the pin that takes the groove shown in Fig. 2.

The like marks of reference apply to the same parts in all the figures.

*a*, is the fixed cylinder, set on the end of the camera, or may be a continuation of any tube, for any other similar object. *b*, is a tube, of a size to move easily inside the cylinder *a*, this tube carries one or more lenses *c*, *d*, set in frames, in any usual manner, and the parts, when not in use, may be protected by a cap, or cover, *e*, these parts, so far, are all made as usual, but inside the cylinder *a*, is a spiral or screw formed groove 1, which is cut into the inside of the cylinder, and takes a pin 2, in the tube *b*, this pin 2, goes through the tube *b*, and is attached to the end of the straight spring *f*, on the inside of the tube *b*, with an outward action, not strong enough to cause friction that will wear the parts, or prevent their moving easily, but enough to keep the pin 2, in the groove 1, and compensate any small irregularities caused by use, so as always to keep the pin 2, in place.

The operation is as follows: On turning the tube *b*, in either direction, the pin 2, taking the groove 1, moves the tube *b*, either in, or out, and adjusts the focal distance of the lenses *c*, and *d*, with the other parts of the apparatus. The old method of accomplishing this result has been, to place a rack in the inner tube, with a pinion above, and a thumb wheel, so as to force the tube in a right line, in either direction; this construction is expensive, and very likely to get out of order; but our improvements are cheap, and not liable to get out of order.

Another important point is, that the ordinary means now used, allow a back motion to the tube *b*, on putting on the cap *e*, after the focal distance has been adjusted; and a forward motion, on taking off the cap to use the lens; both of which change the focal distance, and render the operation of the lens uncertain; while by our mode of fitting, the focal distance is not affected, by either putting on, or taking off the cap; and the movement of the pin, in the groove, can be more nicely and certainly regulated, than by a rack and thumb wheel, as now used.

It will be understood, that the pin 2, may be set inside the tube *a*, and the groove 1, be cut around the outside of the tube *b*, so as to produce the same effects, by thus reversing the positions of the regulating parts; the form of the groove and pin, whether square, V formed, or round, being immaterial.

We do not claim to be the inventors of any of the parts herein described and shown; neither do we mean to limit the application of these means to cameras, but to use the same, to adjust the focal distance of lenses in optical instruments, wherever the same may be made available.

What we claim as new, and of our own invention, and desire to secure by Letters Patent of the United States, is—

The combination of the pin 2 spring *f*, and groove 1, with the cylinders *a*, and *b* for the purposes and as described and shown.

In witness whereof, we have hereunto set our signatures this twenty sixth day of October, one thousand eight hundred and fifty.

WILLIAM LEWIS.
W. H. LEWIS.

Witnesses:
WM. SERRELL,
LEMUEL W. SERRELL.